United States Patent
Kamamura et al.

(10) Patent No.: US 7,261,668 B2
(45) Date of Patent: Aug. 28, 2007

(54) METHOD OF GRINDING HALF TOROIDAL CVT DISK

(75) Inventors: Yuko Kamamura, Saitama (JP); Hiroyuki Ikeda, Saitama (JP); Hisashi Machida, Kanagawa (JP); Hiroshi Terakubo, Kanagawa (JP)

(73) Assignee: NKS LTD., Tokyo (JP)

( * ) Notice: Subject to any disclaimer, the term of this patent is extended or adjusted under 35 U.S.C. 154(b) by 201 days.

(21) Appl. No.: 10/638,527

(22) Filed: Aug. 12, 2003

(65) Prior Publication Data

US 2004/0048556 A1 Mar. 11, 2004

Related U.S. Application Data

(62) Division of application No. 09/874,034, filed on Jun. 6, 2001, now Pat. No. 6,663,471.

(30) Foreign Application Priority Data

Jun. 7, 2000 (JP) ............................. 2000-170635

(51) Int. Cl.
F16H 15/38 (2006.01)
(52) U.S. Cl. .............................. 476/40; 476/72; 476/73
(58) Field of Classification Search .................. 476/40, 476/72, 73; 451/47, 54, 57, 209, 253
See application file for complete search history.

(56) References Cited

U.S. PATENT DOCUMENTS

| | | | | |
|---|---|---|---|---|
| 4,186,616 A | * | 2/1980 | Sharpe ......................... | 476/10 |
| 4,949,456 A | * | 8/1990 | Kovach et al. .......... | 29/893.35 |
| 5,556,348 A | * | 9/1996 | Kokubu et al. ................ | 476/40 |
| 5,735,769 A | * | 4/1998 | Takemura et al. ............ | 476/40 |
| 6,113,514 A | * | 9/2000 | Okubo et al. .................. | 476/40 |
| 6,450,916 B2 | * | 9/2002 | Kamamura ................... | 476/41 |
| 2004/0077456 A1 | * | 4/2004 | Nakayama et al. .......... | 476/40 |

FOREIGN PATENT DOCUMENTS

| JP | 10-235545 | 9/1998 |
|---|---|---|
| JP | 2000-24899 | 1/2000 |
| JP | 2000-271844 | 10/2000 |

\* cited by examiner

*Primary Examiner*—David M. Fenstermacher
(74) *Attorney, Agent, or Firm*—Sughrue Mion, PLLC

(57) ABSTRACT

A half toroidal CVT disk having an inner surface portion, an outer surface portion and a toroidal surface having a given machining allowance is centered with said inner surface portion worked prior to the heat treatment of said half toroidal CVT disk as the standard thereof, and then is chucked by a chuck mechanism. The toroidal surface of the chucked half toroidal CVT disk is ground by a grinding mechanism with the grinding wheel for grinding the half toroidal CVT disk in a state that one of said half toroidal CVT disk and said tool is inclined at a given angle with respect to the other.

2 Claims, 3 Drawing Sheets

METHOD OF GRINDING HALF TOROIDAL CVT DISK

This is a divisional of application Ser. No. 09/874,034 filed Jun. 6, 2001; the disclosure of which is incorporated herein by reference, and which issued as U.S. Pat. No. 6,663,471 on Dec. 16, 2003.

BACKGROUND OF THE INVENTION

1. Field of the Invention

The present invention relates to a method of grinding a half toroidal CVT disk used as a continuously variable transmission in an automobile.

2. Description of the Related Art

A half toroidal CVT disk includes a disk-shaped disk main body 1; and, as shown in FIG. 5, the disk main body 1 has an inner surface portion 2 consisting of a through hole formed in the central portion thereof, an outer surface portion 3, and a toroidal surface 4 formed on one surface of the disk main body 1. On one end side of the inner surface portion 2, there is formed an inner surface involute spline portion 5; and, on the other end side thereof, there is formed an inside diameter surface 6. And, the toroidal surface 4, inner surface involute spline portion 5 and inside diameter surface 6, except for the outer surface portion 3, must be respectively ground so as to have concentricity accuracy of a given value or higher.

For this reason, conventionally, for example, as disclosed in JP-A-2000-271844, in a state where the outer surface portion 3 is centered with the inner surface involute spline portion 5 as the standard thereof and is chucked in the thus centered state, the outer surface portion 3 is ground; and, with the thus ground outer surface portion 3 as the standard thereof, the toroidal surface 4 and inner surface portion 2 are respectively ground in separate steps.

Also, as a compound grinding machine, conventionally, there is known a compound grinding machine which, as disclosed in JP-A-10-235545, comprises a plurality of spindle devices each including a work chuck for chucking a work, while these spindle devices are carried on a swing table which is capable of indexingly swinging in such a manner to be able to correspond to a plurality of operation positions. At these operation positions, there are disposed two or more kinds of grinding devices and, using the grinding devices, the works chucked by the work chucks are respectively ground to thereby shorten the grinding time.

In case where the toroidal surface and inner surface portion of the half toroidal CVT disk are ground in separate steps, it is necessary to grind the outer surface portion as the common standard surface for securing the concentricity of these grinding surfaces. However, to grind the outer surface portion is not necessary for the function of the half toroidal CVT disk and thus the step of grinding the outer surface portion provides a great factor in the increased cost of the half toroidal CVT disk.

Also, there must be secured concentricity between the inner surface involute spline portion to be worked prior to the heat treatment of the half toroidal CVT disk and the toroidal surface and inner surface portion to be ground.

Further, in case where the outer surface, inner surface portion and toroidal surface are ground sequentially in separate steps, the half toroidal CVT disk not only must be mounted onto and removed from the grinding machines but also must be delivered between the grinding machines in these respective grinding steps, which makes it troublesome to grind the half toroidal CVT disk and thus provides an important factor in the increased cost thereof.

Still further, in the case of the toroidal surface grinding operation, there is a limit on the diameter of a grinding wheel and the direction of the rotary shaft of the grinding wheel must be set at an angle of 58°-65° (±15°) with respect to the direction of the rotary shaft of the work.

SUMMARY OF THE INVENTION

The present invention aims at eliminating the drawbacks found in the above-mentioned conventional half toroidal CVT disk grinding methods. Accordingly, it is a main object of the invention to provide a half toroidal CVT disk grinding method which can secure concentricity between the inner surface portion and toroidal surface of the half toroidal CVT disk while omitting the step of grinding the outer surface portion thereof, whereby the inner surface portion is smoother than the outer surface portion, thereby being able to reduce the number of manufacturing steps of the half toroidal CVT disks and thus the manufacturing cost thereof.

Also, it is a second object of the invention to provide a half toroidal CVT disk grinding method which is capable of not only grinding the inner surface portion and toroidal surface of the half toroidal CVT disk simultaneously using a compound grinding machine while they remain chucked by the same chuck mechanism but also securing concentricity between the inner surface portion and toroidal surface.

Further, it is a third object of the invention to provide a half toroidal CVT disk grinding method which, in case where the inner surface portion of the half toroidal CVT disk is hard broached after the half toroidal CVT disk is thermally treated, can grind the toroidal surface of the half toroidal CVT disk with the thus hard broached inner surface portion as the standard thereof to omit the step of grinding the outer surface portion the half toroidal CVT disk, thereby being able to reduce the number of manufacturing steps of the half toroidal CVT disk and thus the manufacturing cost thereof.

In attaining the above objects, according to a first aspect of the invention, there is provided a method of grinding a half toroidal CVT disk by a grinding mechanism with a tool for grinding the half toroidal CVT disk, the half toroidal CVT disk having an inner surface portion, an outer surface portion and a toroidal surface having a given machining allowance, the method including the steps of: centering the half toroidal CVT disk with a first part of the inner surface portion worked prior to the heat treatment of the half toroidal CVT disk as the standard thereof; chucking the centered half toroidal CVT disk by a chuck mechanism; grinding the toroidal surface of the chucked half toroidal CVT disk in a state that one of the half toroidal CVT disk and the tool is inclined at a given angle with respect to the other; and grinding a second part of the inner surface portion simultaneously with the toroidal surface in a compound manner.

Further, according to a second aspect of the invention, there is provided a method of grinding a half toroidal CVT disk by a grinding mechanism with a tool for grinding the half toroidal CVT disk, the half toroidal CVT disk having an inner surface portion, an outer surface portion and a toroidal surface having a given machining allowance, the method comprising the steps of: hard-broaching the inner surface portion after the heat treatment of the half toroidal CVT disk; centering the half toroidal CVT disk with the hard broached inner surface portion as the standard thereof; chucking the centered half toroidal CVT disk by a chucking mechanism; and grinding the toroidal surface of the chucked half toroidal CVT disk in a state that one of the half toroidal CVT disk and the tool is inclined at a given angle with respect to the other.

Now, according to the first aspect of the invention, the half toroidal CVT disk is centered with the inner surface portion worked prior to the heat treatment of the half toroidal CVT disk as the standard thereof and is chucked in the thus centered state by the chuck mechanism and, in the centered state, the toroidal surface is ground. Thanks to this, even in case where the step of grinding the outer surface portion of the half toroidal CVT disk is omitted, there can be secured concentricity between the inner surface portion and toroidal surface of the half toroidal CVT disk. This can decrease the number of manufacturing steps of the half toroidal CVT disk, so that the manufacturing cost of the half toroidal CVT disk can be reduced. Further, when the toroidal surface is ground, the inner surface portion is ground simultaneously in a compound manner. This makes it possible not only to secure concentricity between the inner surface portion and toroidal surface of the half toroidal CVT disk but also to shorten the grinding operation time, thereby being able to reduce the manufacturing cost of the half toroidal CVT disk.

Further, according to the second aspect of the invention, in case where the inner surface portion is hard broached after the heat treatment of the half toroidal CVT disk, in a state where the half toroidal CVT disk is centered with the thus hard broached inner surface portion and is chucked in the thus centered state by the chuck mechanism, the toroidal surface is ground. Due to this, there is eliminated the step of grinding the outer surface portion of the half toroidal CVT disk to thereby decrease the number of manufacturing steps of the half toroidal CVT disk, so that the manufacturing cost of the half toroidal CVT disk can be reduced.

DETAILED DESCRIPTION OF THE PREFERRED EMBODIMENTS

Now, description will be given below of the preferred embodiments of a method for grinding a half toroidal CVT disk according to the invention with reference to the accompanying drawings.

Figure 1:
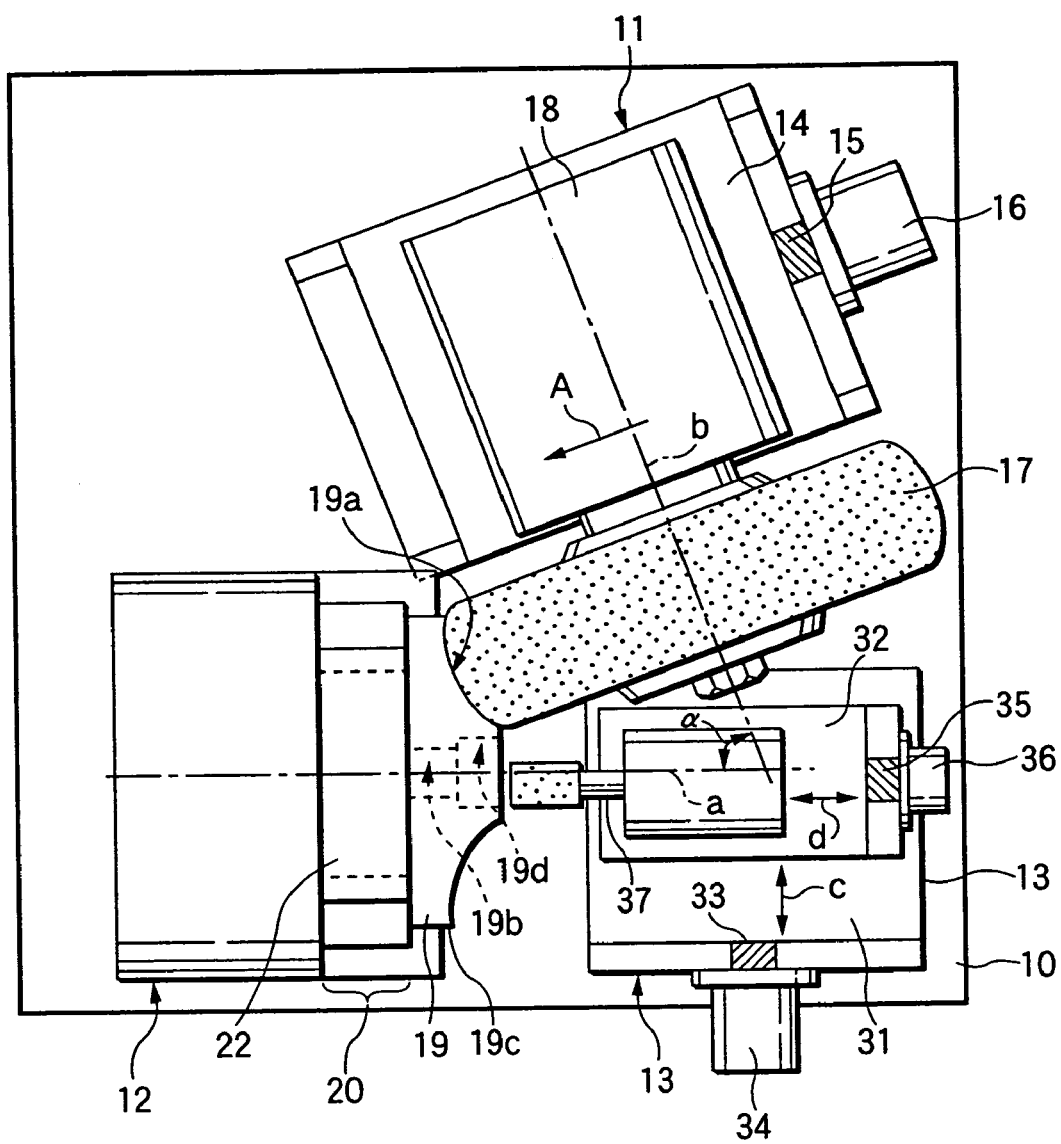
FIG. 1 is a schematic plan view of a grinder, showing a first embodiment of a method for grinding a half toroidal CVT disk according to the invention.
Figure 2:
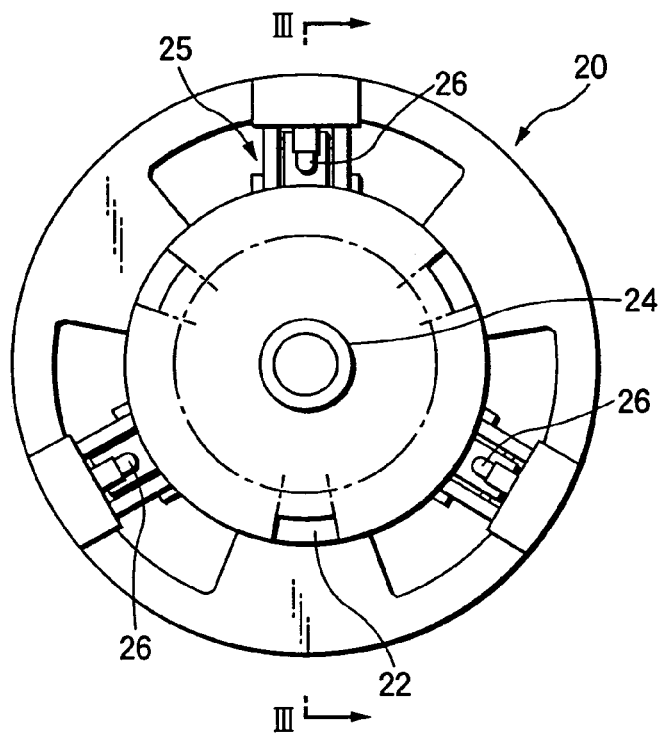
FIG. 2 is a front view of a chuck mechanism employed in the first embodiment.
Figure 3:
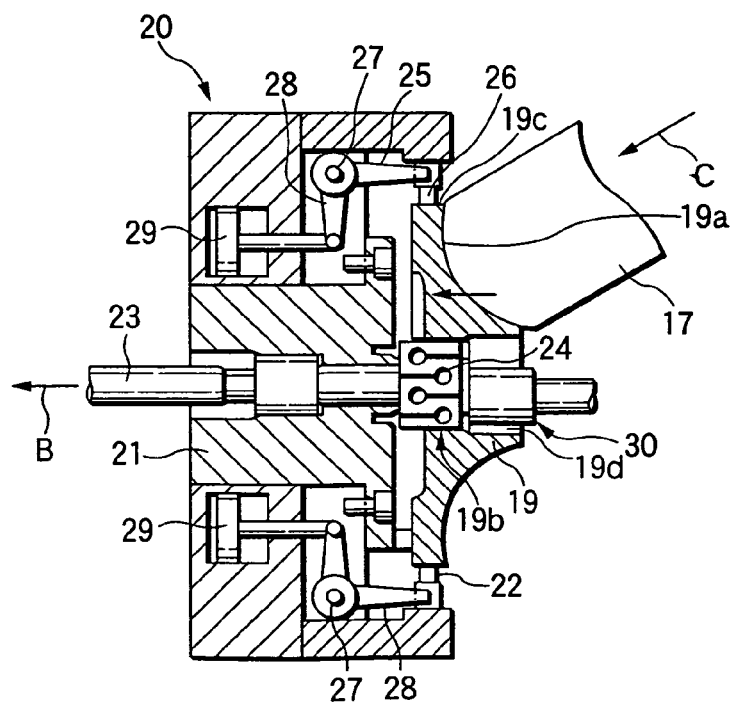
FIG. 3 is a section view taken along the III-III line shown in FIG. 2.

FIGS. 1 to 3 show a first embodiment of a method for grinding a half toroidal CVT disk according to the invention. As shown in FIG. 1, a grinding machine 10 includes a grinding mechanism 11, a drive mechanism 12 and an inner surface grinding unit 13. The grinding mechanism 11 includes a cutting table 14, while the cutting table 14 can be driven in the direction of an arrow mark A shown in FIG. 1 through a ball screw 15 by a servo motor 16.

The cutting table 14 includes a drive motor (not shown) which can drive and rotate a grinding wheel 17, that is, the rotational force of this drive motor can be transmitted to the grinding wheel 17 through a spindle 18. The grinding surface of the outer peripheral surface of the grinding wheel 17 is formed in a curved shape having a radius corresponding to the toroidal surface 19a of a half toroidal CVT disk (which is hereinafter referred to as a work 19) which is a finished product with the grinding operation thereof completed. Therefore, since the work 19 has a machining allowance in a state before it is ground, the radius of the surface to be ground of the work 19 is set smaller than the diameter of the grinding surface of the outer peripheral surface of the grinding wheel 17. Here, an angle $\alpha$ between the rotation center axis a of the work 19 and the center axis b of the grinding wheel is set in the range of 58°-65° ($\mp$15°).

The drive mechanism 12 includes a drive motor (not shown), while this drive motor includes a chuck mechanism 20 for chucking the work 19. The chuck mechanism 20 is structured as shown in FIGS. 2 and 3. That is, a chuck main body 21 includes a work receiving portion 22 formed in the front portion thereof and, in the central portion of the work receiving portion 22, there is disposed a collect 24 which is connected to a draw bar 23.

And, in case where the work 19 is set on the work receiving portion 22, the collect 24 is inserted into the inner surface involute spline portion 19b of the work 19. In this state, in case where the draw bar 23 is pulled in the direction of an arrow mark B shown in FIG. 3, the collect 24 is allowed to spread, thereby being able to hold the inner surface involute spline portion 19b of the work 19. At the then time, the work 19 is also pulled in the same direction and is thereby butted against the standard surface of the work receiving portion 22.

Further, on the outer periphery of the work receiving portion 22 of the chuck main body 21, there is disposed a floating chuck mechanism 25. The floating chuck mechanism 25 includes three pawls 26 so that the outer periphery of the work 19 can be held at three positions spaced at regular intervals of 120° by these three pawls 26, while the three pawls 26 are respectively connected to their associated cylinders 29 through their associated levers 28 which can be rotated about their associated pivots 27.

And, in case where the levers 28 are pulled by the cylinders 29 respectively, the levers 28 can be respectively rotated about their pivots 27 and the pawls 26 can be respectively moved toward the work 19, thereby holding the outer surface portion 19c of the work 19. At the then time, even in case where the inner surface portion 19d and outer surface portion 19c of the work 19 happen to be out of concentricity with each other, due to the action of the floating chuck mechanism 25, there is eliminated the possibility that the pawls 26 can be made free or can be strongly pressed against the outer surface portion 19c of the work 19 in part.

Now, the inner surface grinding unit 13, as shown in FIG. 1, includes an inner surface grinding cutting table 31 and an inner surface grinding traverse table 32 which is carried on the inner surface grinding cutting table 31. The inner surface grinding cutting table 31 can be driven in the direction of an arrow mark c shown in FIG. 1 through a ball screw 33 by a servo motor 34, while the inner surface grinding traverse table 32 can be driven in the direction of an arrow mark d shown in FIG. 1 through a ball screw 35 by a servo motor 36.

The inner surface grinding traverse table 32 carries an inner surface grinding spindle 37 thereon and, on the inner surface grinding spindle 37, there is mounted an inner surface grinding wheel 30. And, the inner surface grinding wheel 30 is used to grind the inner surface portion 19d of the work 19.

Next, description will be given below of the operation of the above-described first embodiment of a half toroidal CVT disk according to the invention.

That is, the work 19 chucked by the chuck mechanism 20 is rotated using the drive motor (not shown) of the drive mechanism 12 and, at the same time, the grinding wheel 17 of the grinding mechanism 11 is rotated using the drive motor (not shown). In this state, in case where the cutting table 14 is moved in the A direction using the servo motor 16, the grinding wheel 17 moves forward in the radial direction C shown in FIG. 3 with respect to the toroidal surface 19a of the work 19 and thus cuts the toroidal surface 19a to thereby grind the same.

On the other hand, at the then time, since not only the inner surface grinding wheel 30 mounted on the inner surface grinding spindle 37 is rotated but also the inner surface grinding cutting table 31 is moved in the arrow mark c direction by the servo motor 34 to execute a cutting operation, the inner surface portion 19d of the work 19 is ground simultaneously by the inner surface grinding wheel 30, that is, the inner surface portion 19d is ground in a compound manner.

In this manner, in a state where the toroidal surface 19a is centered with the inner surface involute spline portion 19b worked prior to execution of the heat treatment of the half toroidal CVT disk serving as the work 19 as the standard thereof and is chucked by the chuck mechanism 20, the toroidal surface 19a is ground. Thanks to this, even in case where the step of grinding the outer surface portion 19c is omitted, concentricity between the inner surface portion 19d and toroidal surface 19a can be secured. This can reduce the number of the manufacturing steps of the half toroidal CVT disk, which in turn makes it possible to reduce the manufacturing cost thereof.

By the way, in the case of a light grinding operation, only the collet chucking function of the chuck mechanism 20 can provide sufficient holding rigidity for the work 19. However, in the case of a grinding operation to be executed in the present embodiment, the toroidal surface 19a must be ground in a wide range and, in some cases, the grinding resistance in the radial direction can range up to 40 kgf. In such case, there is a possibility that the work 19 can be moved or shifted in position, which lowers the grinding accuracy (roundness and chatter). Therefore, in order to obtain more sufficient holding rigidity, the outer surface portion 19c of the work 19 is held by the floating chuck mechanism 25. However, it should be noted here that the floating chuck mechanism 25 is not always necessary.

Also, in the above-mentioned first embodiment, when the toroidal surface 19a is ground in a state where it is centered with a part of the inner surface involute spline portion 19b of the half toroidal CVT disk serving as the work 19 as the standard thereof and is chucked by the chuck mechanism 20, the inner surface portion 19d is ground simultaneously with the grinding of the toroidal surface 19a, that is, in a compound manner by the inner surface grinding wheel 30. Thanks to this, concentricity between the inner surface portion 19d and toroidal surface 19a can be secured as well as the grinding operation time can be shortened, thereby being able to reduce the manufacturing cost of the half toroidal CVT disk.

Figure 4:
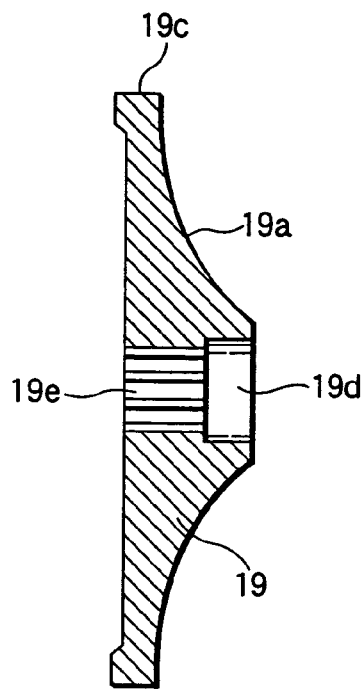
FIG. 4 is a longitudinal side section view of a half toroidal CVT disk including an inner surface ball spline groove, showing a second embodiment of a method for grinding a half toroidal CVT disk according to the invention; and, FIG. 5 is a longitudinal side section view of a conventional half toroidal CVT disk including an ordinary inner surface involute spline portion.
Figure 5:
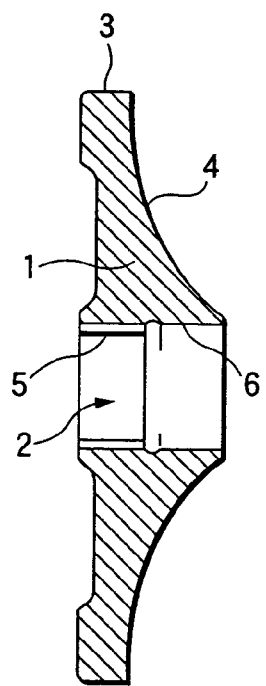

Now, FIG. 4 shows a second embodiment of a method for grinding a half toroidal CVT disk according to the invention.

In the second embodiment, in the inner surface portion of a work 19 which consists of a different half toroidal CVT disk from the disk 19 employed in the first embodiment, there is formed an inner surface ball spline groove 19e. In the case of the work 19 having such inner surface ball spline groove 19e, after it is thermally treated, the inner surface ball spline groove 19e must also be worked.

For example, the inner surface ball spline groove 19e and inner surface portion 19d can be worked integrally by hard broaching. In this case, in a state where the thus hard broached inner surface portion 19d is chucked by the chuck mechanism 20 according to the first embodiment and the concentricity of the toroidal surface 19a with the hard broached inner surface portion 19d is secured, the toroidal surface 19a is ground using the grinding wheel 17.

In case where only the inner surface ball spline groove 19e is hard broached but the inner surface portion 19d is not hard broached after the disk 19 is thermally treated, after the inner surface ball spline groove 19e is received by its associated ball and is then centered, in order to secure the rigidity and holding force of the disk 19, the outer surface portion 19c is chucked by a floating chuck mechanism 25 similar to that of the first embodiment and the toroidal surface 19a is then ground.

In this manner, in case where the inner surface portion of the work is hard broached after the work is thermally treated, the toroidal surface of the work is ground with the thus hard broached inner surface as the standard thereof. This eliminates the need to grind the outer surface portion of the work, thereby being able to reduce the number of manufacturing steps of the half toroidal CVT disk. As a result of this, the manufacturing cost of the half toroidal CVT disk can be reduced.

While only certain embodiments of the invention have been specifically described herein, it will apparent that numerous modifications may be mede thereto without departing from the spirit and scope of the invention.

As has been described heretofore, according to the first aspect of the invention, even in case where the step of grinding the outer surface of a half toroidal CVT disk is omitted, whereby the inner surface is smoother than the outer surface, concentricity between the inner surface portion and toroidal surface of the half toroidal CVT disk can be secured. This can decrease the number of manufacturing steps of the half toroidal CVT disk, so that the manufacturing cost of the half toroidal CVT disk can be reduced. Further, the inner surface portion and toroidal surface of the half toroidal CVT disk can be ground simultaneously in a compound manner by a compound grinding machine while they remain chucked simultaneously by the same chucking mechanism. This makes it possible not only to secure concentricity between the inner surface portion and toroidal surface of the half toroidal CVT disk but also to shorten the grinding operation time, thereby being able to enhance the productivity of the half toroidal CVT disk.

According to the second aspect of the invention, in case where the inner surface portion of the half toroidal CVT disk is hard broached after the disk is thermally treated, the toroidal surface of the half toroidal CVT disk can be ground with the thus hard broached inner surface portion as the standard thereof.

This eliminates the step of grinding the outer surface of the half toroidal CVT disk and thus decreases the number of manufacturing steps of the half toroidal CVT disk, thereby being able to reduce the manufacturing cost of the half toroidal CVT disk.

What is claimed is:

1. A half toroidal CVT disk, comprising;
an inner surface portion adapted to be inserted with an input shaft of a half toroidal CVT therein;
an outer surface portion; and
a toroidal surface with a curved shape adapted to be brought into contact with a power roller of said half toroidal CVT;
wherein said inner surface portion is smoother than said outer surface portion, and wherein the outer surface portion is free from grinding.

2. A half toroidal CVT according to claim 1, wherein said outer surface portion is free from grinding after being heat treated.

* * * * *

UNITED STATES PATENT AND TRADEMARK OFFICE
CERTIFICATE OF CORRECTION

PATENT NO.       : 7,261,668 B2                                  Page 1 of 1
APPLICATION NO.  : 10/638527
DATED            : August 28, 2007
INVENTOR(S)      : Yuko Kamamura et al.

It is certified that error appears in the above-identified patent and that said Letters Patent is hereby corrected as shown below:

On the title page item (73) Assignee (should be) NSK LTD

Signed and Sealed this

Eleventh Day of March, 2008

JON W. DUDAS
*Director of the United States Patent and Trademark Office*